(12) United States Patent
Maida, Jr.

(10) Patent No.: US 12,565,960 B1
(45) Date of Patent: Mar. 3, 2026

(54) PIPE VALVE INSULATION COVER

(71) Applicant: Dominic J. Maida, Jr., Newark, DE (US)

(72) Inventor: Dominic J. Maida, Jr., Newark, DE (US)

( * ) Notice: Subject to any disclaimer, the term of this patent is extended or adjusted under 35 U.S.C. 154(b) by 0 days.

(21) Appl. No.: 18/797,857

(22) Filed: Aug. 8, 2024

(51) Int. Cl.
 *F16L 59/16* (2006.01)

(52) U.S. Cl.
 CPC ....... *F16L 59/168* (2013.01); *Y10T 137/7036* (2015.04)

(58) Field of Classification Search
 CPC . F16L 59/161; F16L 59/168; Y10T 137/7036; Y10T 137/7043; Y10T 137/7062
 USPC .............. 137/375; 138/149; 285/47; 428/76
 See application file for complete search history.

(56) References Cited

U.S. PATENT DOCUMENTS

| | | | |
|---|---|---|---|
| 1,108,840 A | 8/1914 | Franke | |
| 2,778,405 A | 1/1957 | Stephens et al. | |
| 3,044,915 A | 7/1962 | Jacobsen | |
| 3,557,840 A | 1/1971 | Maybee et al. | |
| 3,560,287 A | 2/1971 | Helling | |
| 3,724,491 A | 4/1973 | Knudsen et al. | |
| 4,009,735 A | 3/1977 | Pinsky | |
| 4,046,406 A | 9/1977 | Press et al. | |
| 4,112,967 A | 9/1978 | Withem | |
| 4,142,565 A | 3/1979 | Plunkett, Sr. | |
| 4,207,918 A | 6/1980 | Burns et al. | |

| | | | |
|---|---|---|---|
| 4,259,981 A | 4/1981 | Busse | |
| 4,389,270 A | 6/1983 | McClintock | |
| 4,556,082 A | 12/1985 | Riley et al. | |
| 4,696,324 A | 9/1987 | Petronko | |
| 4,778,703 A | 10/1988 | Fontanilla | |
| 4,791,236 A | 12/1988 | Klein et al. | |
| 4,807,669 A | 2/1989 | Prestidge, Sr. et al. | |
| 4,930,543 A | 6/1990 | Zuiches | |
| 5,025,836 A | 6/1991 | Botsolas | |
| 5,027,862 A | 7/1991 | Laybourn | |
| 5,112,661 A | 5/1992 | Pendergraft et al. | |
| 5,158,114 A | 10/1992 | Botsolas | |

(Continued)

OTHER PUBLICATIONS

U.S. Appl. No. 11/755,772, filed May 31, 2007, US20080295896, Dec. 4, 2008.

(Continued)

*Primary Examiner* — Kenneth Rinehart
*Assistant Examiner* — Jonathan J Waddy
(74) *Attorney, Agent, or Firm* — McCarter & English, LLP

(57) ABSTRACT

Exemplary embodiments are directed to a pipe valve insulation cover. The cover includes a flexible sheet including a first side and a second side positioned over each other in a substantially overlapping manner. In the overlapping configuration, the flexible sheet defines a top edge, a bottom edge opposing the top edge, a right edge, and a left edge opposing the right edge. The flexible sheet defines a hollow interior in the overlapping configuration. The cover includes a first opening formed in the flexible sheet at or near the top edge, a second opening formed in the flexible sheet at or near the right edge, a third opening formed in the flexible sheet at or near the left edge, and a fourth opening formed in the flexible sheet at or near the bottom edge.

16 Claims, 8 Drawing Sheets

(56)                    References Cited

U.S. PATENT DOCUMENTS

| | | | |
|---|---|---|---|
| 5,388,271 | A * | 2/1995 | Sessoms ............ A41D 13/0015 |
| | | | 2/113 |
| 5,522,433 | A | 6/1996 | Nygaard |
| 5,713,394 | A | 2/1998 | Nygaard |
| 5,901,756 | A | 5/1999 | Goodrich |
| 5,941,287 | A | 8/1999 | Terito, Jr. et al. |
| 5,967,194 | A | 10/1999 | Martin |
| 6,012,480 | A | 1/2000 | Helmsderfer |
| 6,019,136 | A | 2/2000 | Walsh et al. |
| 6,491,067 | B1 | 12/2002 | Davenport et al. |
| 6,564,498 | B2 * | 5/2003 | Sawtell ................. A01K 89/00 |
| | | | 206/304.2 |
| 6,907,907 | B2 | 6/2005 | Maida |
| 2003/0150489 | A1 * | 8/2003 | McAtarian ........... B08B 17/025 |
| | | | 137/312 |
| 2004/0010394 | A1 | 1/2004 | Koveshnikov |
| 2008/0307737 | A1 * | 12/2008 | Pirogovsky .............. B32B 5/08 |
| | | | 52/506.02 |
| 2011/0020579 | A1 * | 1/2011 | Leonard ............... F16L 59/168 |
| | | | 428/58 |
| 2011/0108200 | A1 * | 5/2011 | Hart ......................... B32B 5/28 |
| | | | 156/510 |
| 2013/0140008 | A1 * | 6/2013 | Mazzella ................. F28D 7/10 |
| | | | 165/135 |
| 2016/0219955 | A1 * | 8/2016 | Uy ......................... A41D 31/18 |

OTHER PUBLICATIONS

U.S. Appl. No. 10/607,793, filed Jun. 27, 2003, US20040261879, Dec. 30, 2004.

* cited by examiner

PIPE VALVE INSULATION COVER

TECHNICAL FIELD

The present disclosure relates to a pipe valve insulation cover and, in particular, to an insulation wrap for a 6-way valve that allows for convenient installation, customization, removal, and reapplication/reinstallation when access to the valve is required.

BACKGROUND

Pipes and valves are typically insulated by wrapping insulation around such structures and using tape or other adhesive means for maintaining the insulation in position. When access to the valve is required for use and/or maintenance, the insulation around the pipe valve is typically destroyed during the removal process. Once the insulation is removed from the valve, it is often difficult to replace and the technician working on the valve generally moves on without replacement or repair of the insulation. As such, the valve is either not insulated or not insulated well.

Further, valves have a variety of designs, with complex valves being more difficult to wrap with insulation using traditional methods. For example, FIG. 1 illustrates a 6-way valve 10 that has a complex structure for wrapping with traditional insulation. The valve 10 includes an actuator 12 at the top and a valve body 14 disposed below the actuator 12. Two ports 16, 18 extend in one direction on the right side of the valve body 14, two ports 20, 22 extend from a front side of the valve body 14 and are oriented 90° from the ports 16, 18, and two ports 24, 26 extend from a left side of the valve body 14 and are oriented 90° from the ports 20, 22 (and oriented 180° from the ports 16, 18). The pipes 30 extending from ports 16-26 can include insulation 28. However, insulation needs to be added around the valve 10 itself. Properly and efficiently wrapping a 6-way valve 10 can be difficult due to the tight spaces around the valve 10 and between the insulation 28. In addition, repairing torn insulation after access to such valve 10 is typically avoided, resulting in inefficient valve 10 usage.

Thus, a need exists for a pipe valve insulation cover that allows for convenient installation, removal and reinstallation over valves having a complex structure, including a 6-way valve. These and other needs are addressed by the pipe valve insulation cover of the present disclosure.

SUMMARY

In accordance with embodiments of the present disclosure, an exemplary pipe valve insulation cover is provided. The cover includes a flexible sheet including a first side and a second side positioned over each other in a substantially overlapping manner. In the overlapping configuration, the flexible sheet defines a top edge, a bottom edge opposing the top edge, a right edge, and a left edge opposing the right edge, and the flexible sheet defines a hollow interior. The cover includes a first opening formed in the flexible sheet at or near the top edge, a second opening formed in the flexible sheet at or near the right edge, a third opening formed in the flexible sheet at or near the left edge, and a fourth opening formed in the flexible sheet at or near the bottom edge.

In some embodiments, in the overlapped configuration, the flexible sheet can define a substantially T-shaped configuration. In some embodiments, a central longitudinal axis of the first and fourth openings can be substantially aligned. In some embodiments, a central longitudinal axis of the second and third openings can be substantially aligned. In some embodiments, a central longitudinal axis of the first and fourth openings can be substantially perpendicularly oriented to a central longitudinal axis of the second and third openings.

In some embodiments, the top edge can include a non-separable section of the flexible sheet that connects the first side and the second side of the flexible sheet. The non-separable section can be the only structure non-releasably connecting the first side to the second side of the flexible sheet. The top edge can include a first pair of complementary fastening elements extending from the first opening to the third opening. The first pair of complementary fastening elements can be separable from each other to separate the first side from the second side of the flexible sheet to expose the hollow interior.

The right edge can include a second pair of complementary fastening elements extending from the second opening to the fourth opening. The second pair of complementary fastening elements can be separable from each other to separate the first side from the second side of the flexible sheet to expose the hollow interior. The left edge can include a third pair of complementary fastening elements extending from the third opening to the fourth opening. The third pair of complementary fastening elements can be separable from each other to separate the first side from the second side of the flexible sheet to expose the hollow interior. In some embodiments, the complementary fastening elements can be, e.g., VELCRO®, or the like.

Each of the first, second, third and fourth openings can include a gathering structure along their perimeter. The gathering structure can be an elastic band providing flexibility in expansion and contraction of a diameter of the first, second, third and fourth openings. The cover can include a separating element extending across each of the first, second, third and fourth openings. The separating element can include one end fixedly connected to an edge of the respective first, second, third and fourth openings, and an opposing end releasably connected from an opposing end of the respective first, second, third and fourth openings.

In accordance with embodiments of the present disclosure, an exemplary pipe valve insulation cover system is provided. The system includes a flexible insulation configured to be at least partially wrapped around a valve. The system includes a pipe valve insulation cover configured to be at least partially wrapped around the flexible insulation and the valve. The pipe valve insulation cover includes a flexible sheet including a first side and a second side positioned over each other in a substantially overlapping manner. In the overlapping configuration, the flexible sheet defines a top edge, a bottom edge opposing the top edge, a right edge, and a left edge opposing the right edge, and the flexible sheet defines a hollow interior. The pipe valve insulation cover includes a first opening formed in the flexible sheet at or near the top edge, a second opening formed in the flexible sheet at or near the right edge, a third opening formed in the flexible sheet at or near the left edge, and a fourth opening formed in the flexible sheet at or near the bottom edge.

In accordance with embodiments of the present disclosure, an exemplary method of pipe valve insulation is provided. The method includes wrapping a flexible insulation at least partially around a valve. The method includes wrapping a pipe valve insulation cover at least partially around the flexible insulation and the valve. The pipe valve insulation cover includes a flexible sheet including a first side and a second side positioned over each other in a substantially overlapping manner. In the overlapping configuration, the flexible sheet defines a top edge, a bottom edge opposing the top edge, a right edge, and a left edge opposing the right edge, and the flexible sheet defines a hollow interior configured to at least partially receive the flexible insulation and the valve. The pipe valve insulation cover includes a first opening formed in the flexible sheet at or near the top edge, a second opening formed in the flexible sheet at or near the right edge, a third opening formed in the flexible sheet at or near the left edge, and a fourth opening formed in the flexible sheet at or near the bottom edge.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed pipe valve insulation cover, reference is made to the accompanying figures, wherein.

DESCRIPTION OF EXEMPLARY
EMBODIMENTS

Figure 2:
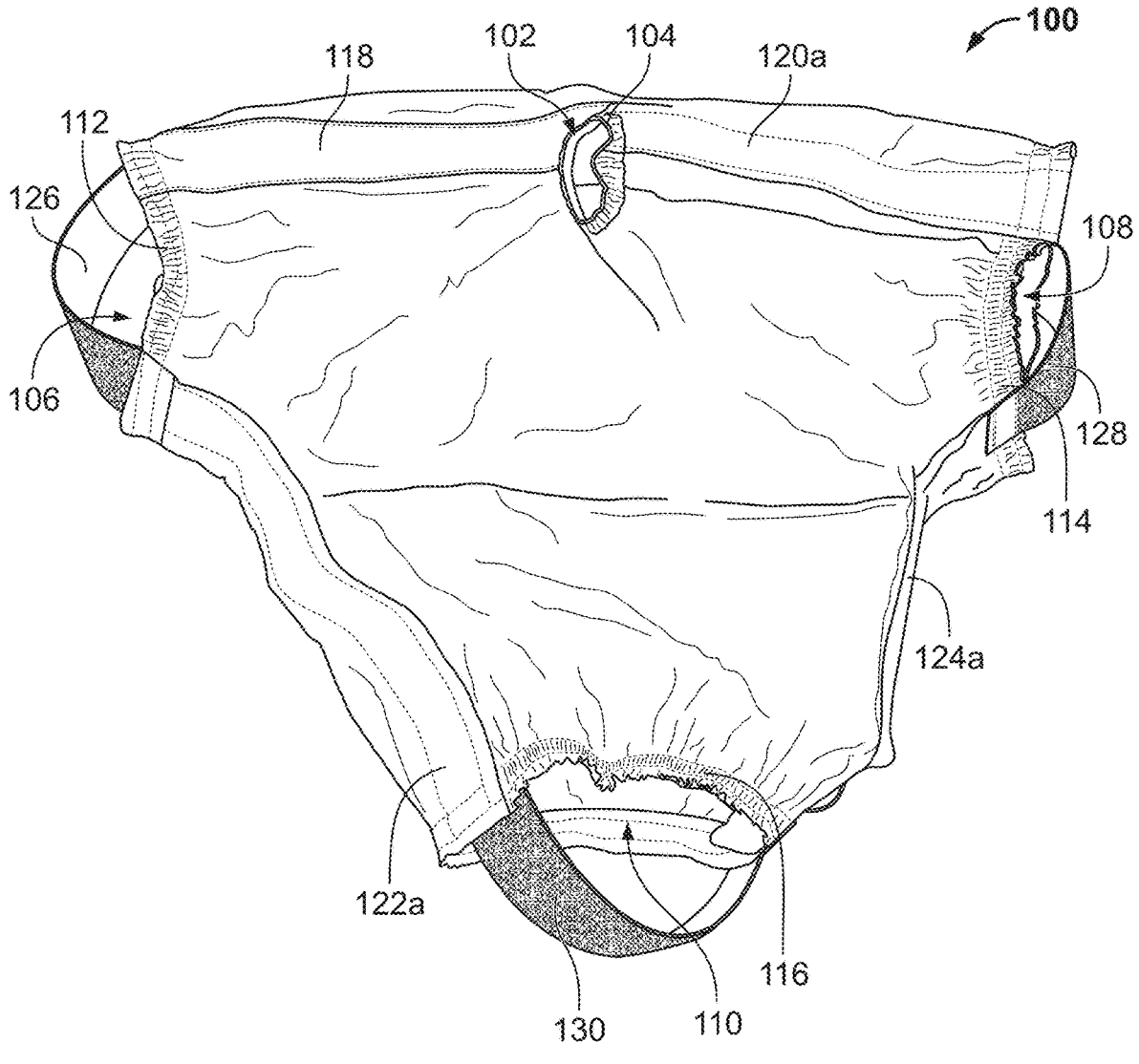
FIG. 2 is a top view of an exemplary pipe valve insulation cover in a closed configuration in accordance with embodiments of the present disclosure.
Figure 3:
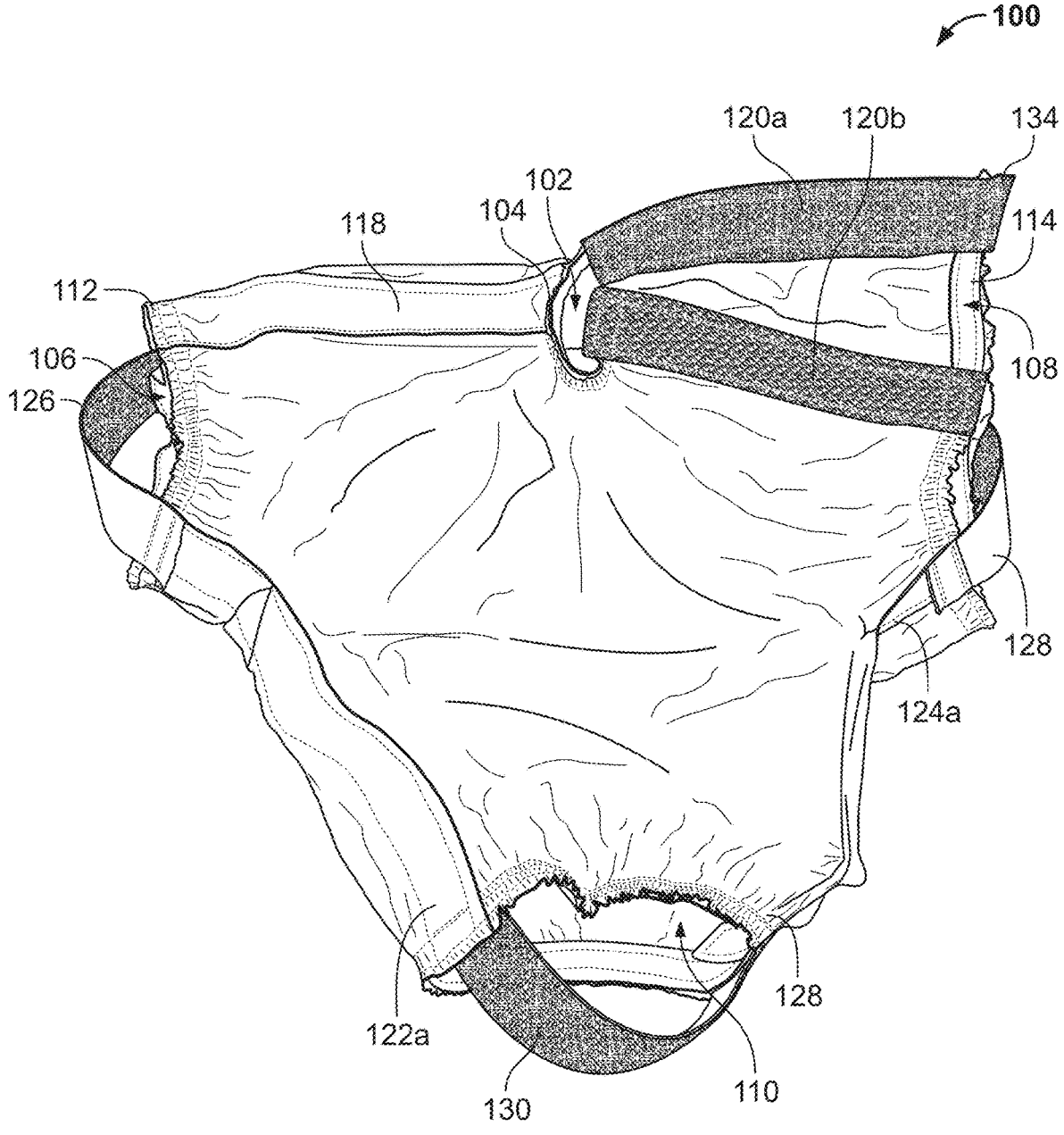
FIG. 3 is a top view of an exemplary pipe valve insulation cover in a partially open configuration in accordance with embodiments of the present disclosure.
Figure 4:
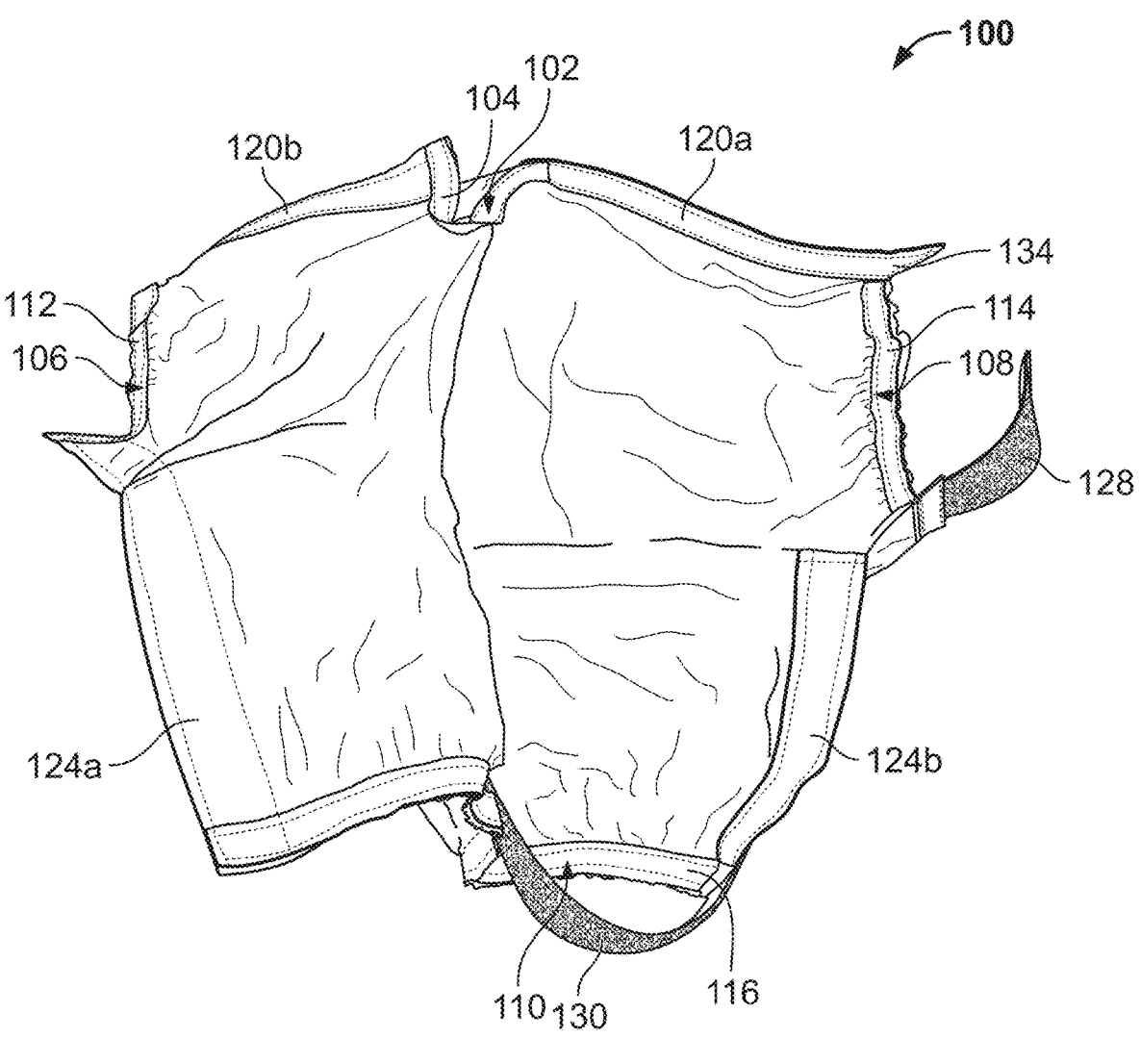
FIG. 4 is a top view of an exemplary pipe valve insulation cover in a partially open configuration in accordance with embodiments of the present disclosure.
Figure 5:
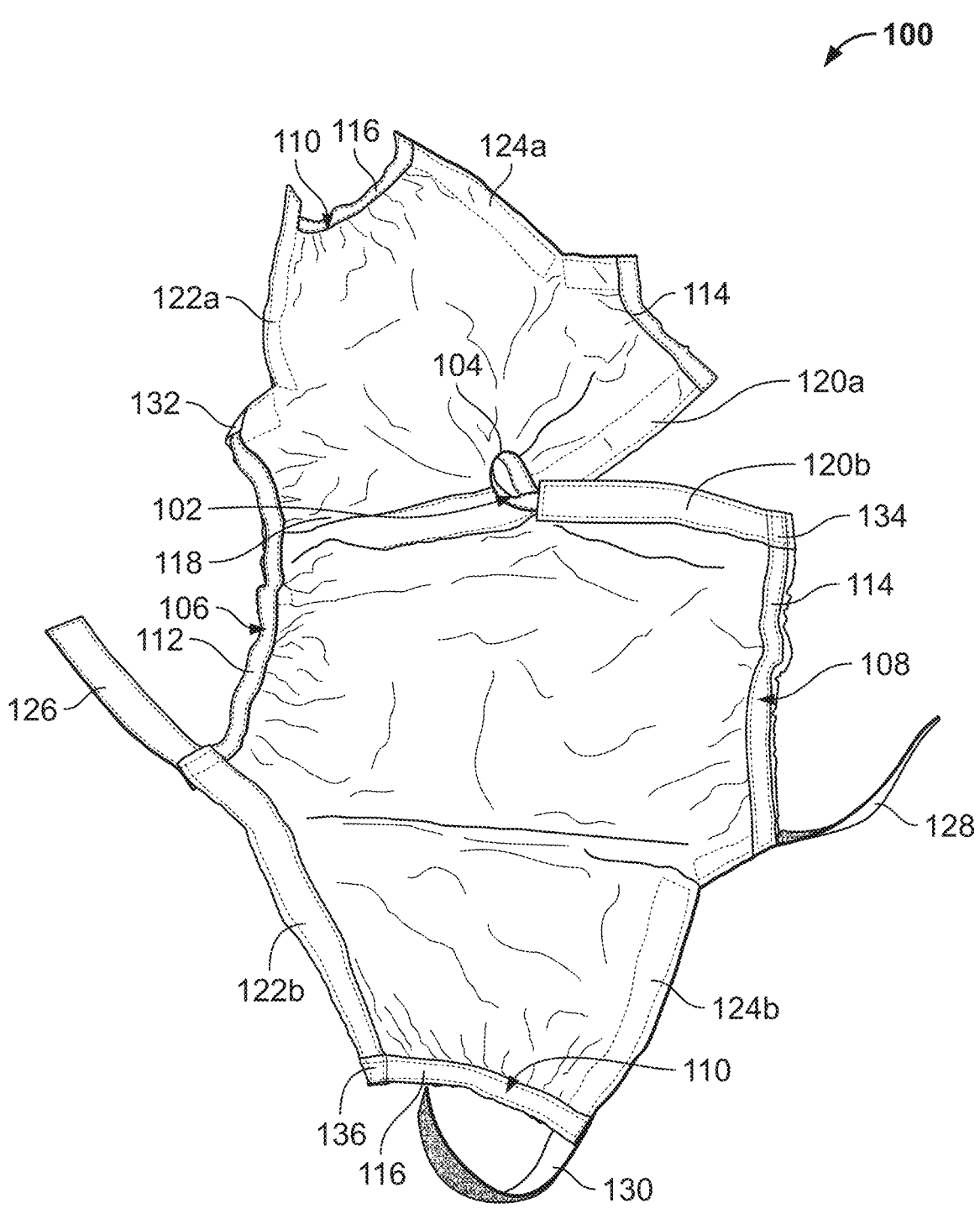
FIG. 5 is a top interior view of an exemplary pipe valve insulation cover in an open configuration in accordance with embodiments of the present disclosure.
Figure 6:
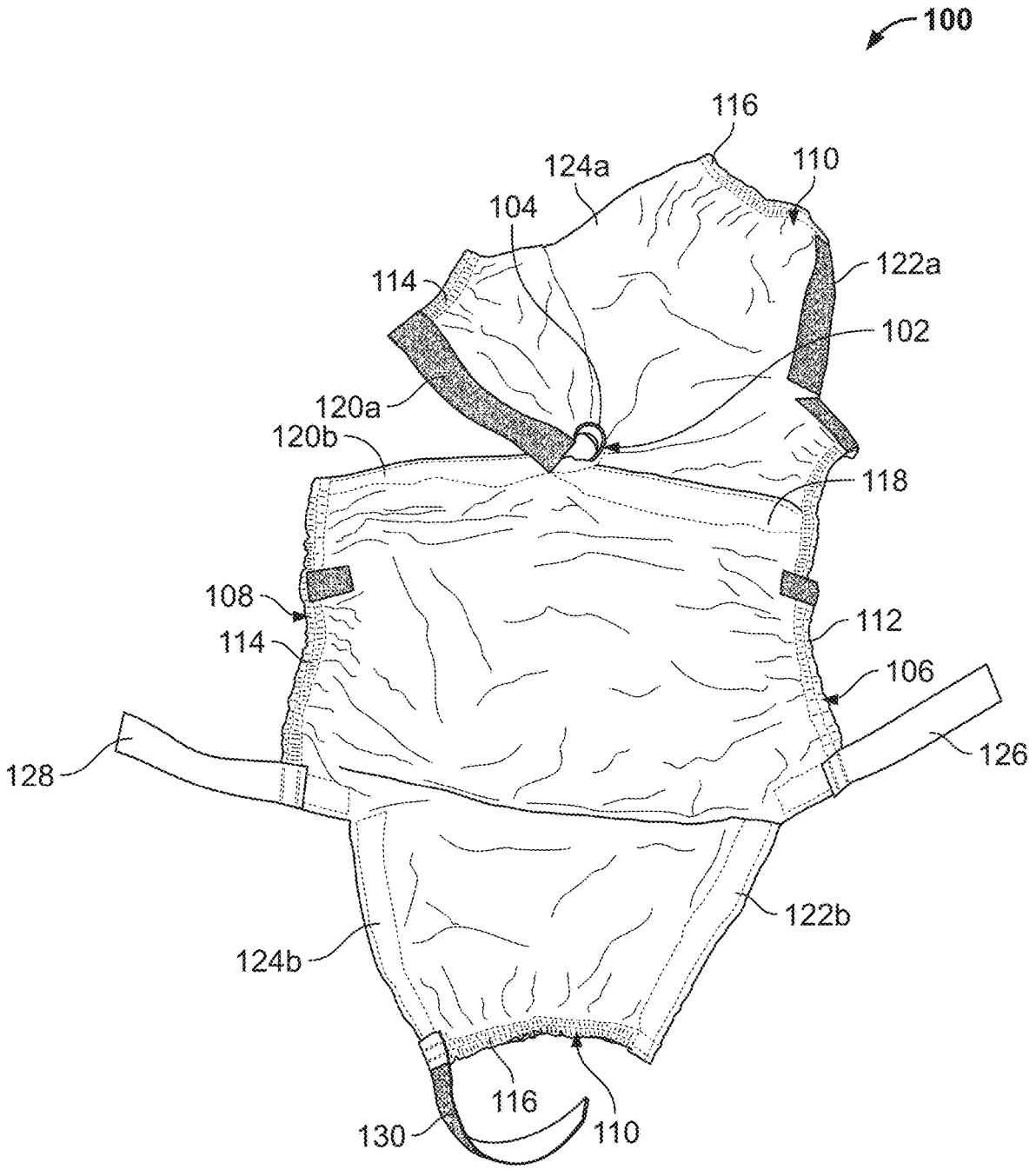
FIG. 6 is a top exterior view of an exemplary pipe valve insulation cover in an open configuration in accordance with embodiments of the present disclosure.

FIGS. 2-6 show top exterior and interior views of an exemplary pipe valve insulation cover 100 (hereinafter referred to as "cover 100") in open and closed configurations. The cover 100 includes a flexible material or sheet that has insulative properties with respect to moisture and temperature. In some embodiments, the cover 100 can be fabricated from TYVEK®, or any other material having similar properties. The sheet can be imperforate. The sheet can be substantially planar/flat and thin, thereby providing flexibility for positioning around the valve 10. The cover 100 includes an outer surface configured to face way from the valve 10 when installed over the valve 10, and an inner surface configured to face the valve 10 when installed over the valve 10. In the fully closed configuration, as shown in FIG. 2, the cover 100 can define a substantially T-shaped configuration with two openings on opposing sides and an opening on the bottom side, with the openings configured to receive ports (and pipes associate with the ports). The cover 100 therefore includes a top edge or surface, an opposing bottom edge or surface, and opposing right and left edges or surfaces.

In particular, the cover 100 includes a first opening 102 in the middle of the top of the cover 100. The first opening 102 is configured to receive therethrough the stem between the valve body 14 and the actuator 12, such that the valve body 14 is insulated while the actuator 12 remains exposed for use. The perimeter of the first opening 102 includes a gathering structure 104 (e.g., an elastic band sewn into the edge of the opening 102) that allows for the diameter of the first opening 102 to be stretched and increased when positioning the cover 100 over the valve body 14, and which retracts around the stem of the valve 10 for a tight insulative fit. The gathering structure 104 therefore provides elasticity for installation of the cover 100 and assists with fastening/tightening of the cover 100 around the valve 10 structure or component.

The cover 100 includes second and third openings 106, 108 on opposing lateral sides of the cover 100. The first opening 102 is positioned substantially centrally between the second and third openings 106, 108. The cover 100 includes a fourth opening 110 at the bottom of the cover 100. The fourth opening 110 defines the bottom side or edge of the cover 100, and is centrally positioned between second and third openings 106, 108. The fourth opening 110 is positioned in an aligned manner on the opposite side of the cover 100 relative to the first opening 102. Thus, the cover 100 includes four openings 102, 106, 108, 110, with one at the top, one on the bottom, one on the right side, and one on the left side of the cover 100 (when viewed in the orientation of FIG. 2).

Each of the openings 106, 108, 110 also includes a gathering structure 112, 114, 116 that allow for the diameter of the respective openings 106, 108, 110 to be customized and stretched around piping and/or insulation associated with the valve 10. Such gathering structures 112, 114, 116 allow the user to conveniently stretch the cover 100 into position around the valve 10. Upon release, the gathering structures 112, 114, 116 tighten around the respective structures passing through the openings 106, 108, 110, thereby ensuring a tight insulative fit. The gathering structures 112, 114, 116 further allow for repetitive installation, removal and reinstallation of the cover 100 onto the valve 10 without damaging the cover 100.

In some embodiments, the diameter of the first opening 102 is dimensioned smaller than the diameter of the openings 106, 108, 110 (when the gathering structures 104, 112, 114, 116 are in the unstretched, natural position). In some embodiments, the diameter of the openings 106, 108, 110 can be substantially equal. The openings 106, 108, 110 can be sized to accommodate piping and insulation associated with the valve 10.

As discussed herein, the cover 100 includes multiple complementary fastening elements that allow for selective releasable attachment of certain sections of the cover 100, thereby permitting the user to install the cover 100 over the valve 10. For example one side (e.g., the left side) of the cover 100 can include a non-detachable or non-separable section 118 that extends from the first opening 102 to the second opening 106. The section 118 can be located along the top surface or top edge of the cover 100. The section 118 can either be fixedly stitched together sections (e.g., if the cover 100 is formed by two pieces of material sewed together), can be attached to each other in a non-separable manner with other means (e.g., adhesive), or can be formed from a single piece of material. When the fastening elements of the cover 100 are all fully open, the section 118 separates the cover 100 into first (or top) and second (bottom) halves or sides. The cover 100 is therefore formed by first and second sides positioned over each other in a substantially overlapping manner with a hollow interior.

The opposing side of the cover 100 (e.g., the right top surface or edge) includes a first pair of complementary fastening elements 120*a*, 120*b* that extend from the first opening 102 to the third opening 108. In some embodiments, the fastening elements 120*a*, 120*b* can be, e.g., hook and loop elements, VELCRO®, or the like. The fastening elements 120*a*, 120*b* allow the right, top side of the cover 100 to be separated and opened completely to separate and open one side of the first opening 102, thereby allowing the gathering structure 104 to be positioned around the stem of the valve 10 (between the body 14 and the actuator 12) (see, e.g., FIGS. 3 and 4). The fastening elements 120*a*, 120*b* are therefore usable for selectively opening and closing a portion of the top surface or edge of the cover 100 for access to the first opening 102.

The cover 100 includes similar complementary fastening elements 122*a*, 122*b* on the left side of the cover 100 and extending from the second opening 106 to the fourth opening 110, and complementary fastening elements 124*a*, 124*b* on the right side of the cover 100 and extending from the third opening 108 to the fourth opening 110. The fastening elements 122*a*, 122*b* allow for selective engagement and disengagement to close and open the space between the openings 106, 110. The fastening elements 124*a*, 124*b* allow for selective engagement and disengagement to close and open the space between the openings 108, 110. Each of the fastening elements 120*a*, 120*b*, 122*a*, 122*b*, 124*a*, 124*b* are therefore independently operated with their respective pairs to open the cover 100, position the cover 100 onto the valve 10, and close the cover 100 over the valve 10. When all fastening elements 120*a*, 120*b*, 122*a*, 122*b*, 124*a*, 124*b* are opened or disengaged, the top and bottom halves of the cover 100 are connected only by the section 118 (see, e.g., FIGS. 5 and 6).

Each of the openings 106, 108, 110 includes a separating element 126, 128, 130 extending across the respective opening 106, 108, 110. The separating elements 126, 128, 130 can be in the form of a hook and loop system (e.g., VELCRO®) capable of engaging with a complementary surfaces 132, 134, 136 for selective engagement or disengagement (see, e.g., FIGS. 3-6). The surfaces 132, 134, 136 can be in the form of fixed strips corresponding with the complementary end of the separating elements 126, 128, 130 to allow for engagement or disengagement. The surfaces 132, 134, 136 can be fixedly located on the inner surface of the respective openings 106, 108, 110. When engaged, the separating elements 126, 128, 130 can divide the openings 106, 108, 110 into substantially equal halves. However, the flexibility of the separating elements 126, 128, 130 allows them to be moved or flexed as needed. In operation, the separating elements 126, 128, 130 can be positioned between two adjacent pipes of the valve 10, thereby assisting with positioning of the cover 100 onto the valve 10.

Figure 1:
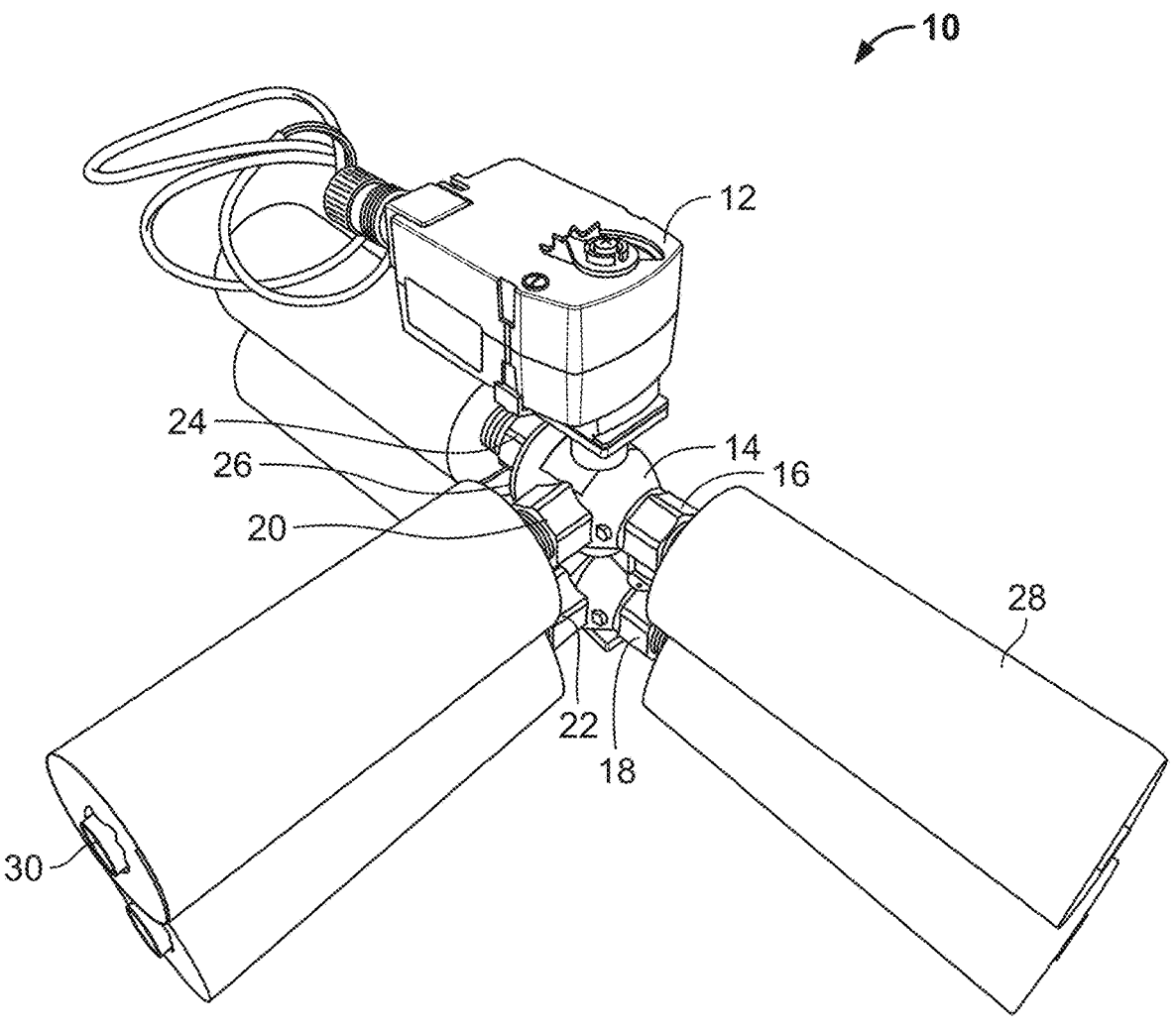
FIG. 1 is a perspective view of a conventional 6-way valve with pipe insulation.

As noted above, the pipes of the valve 10 include insulation 28 that generally fit tightly and are positioned adjacent to each other (see FIG. 1). When the cover 100 is positioned over the insulation 28, the openings 106, 108, 110 define a substantially oval configuration. Although the gathering structures at the openings 106, 108, 110 ensure that the edges of the cover 100 wrap around tightly in an insulative manner around the insulation 28 of the pipes, the central area of the openings 106, 108, 110 may leave exposed areas between the adjacent insulation 28 (e.g., due to the circular nature of the insulation 28). The separating elements 126, 128, 130 can be passed between the adjacent insulation 28 and secured to respective surfaces 132, 134, 136. The separating elements 126, 128, 130 therefore cover any gaps between the insulation 28 and the cover 100 at the openings 106, 108, 110, ensuring full insulation of the valve 10 is achieved.

Figure 7:
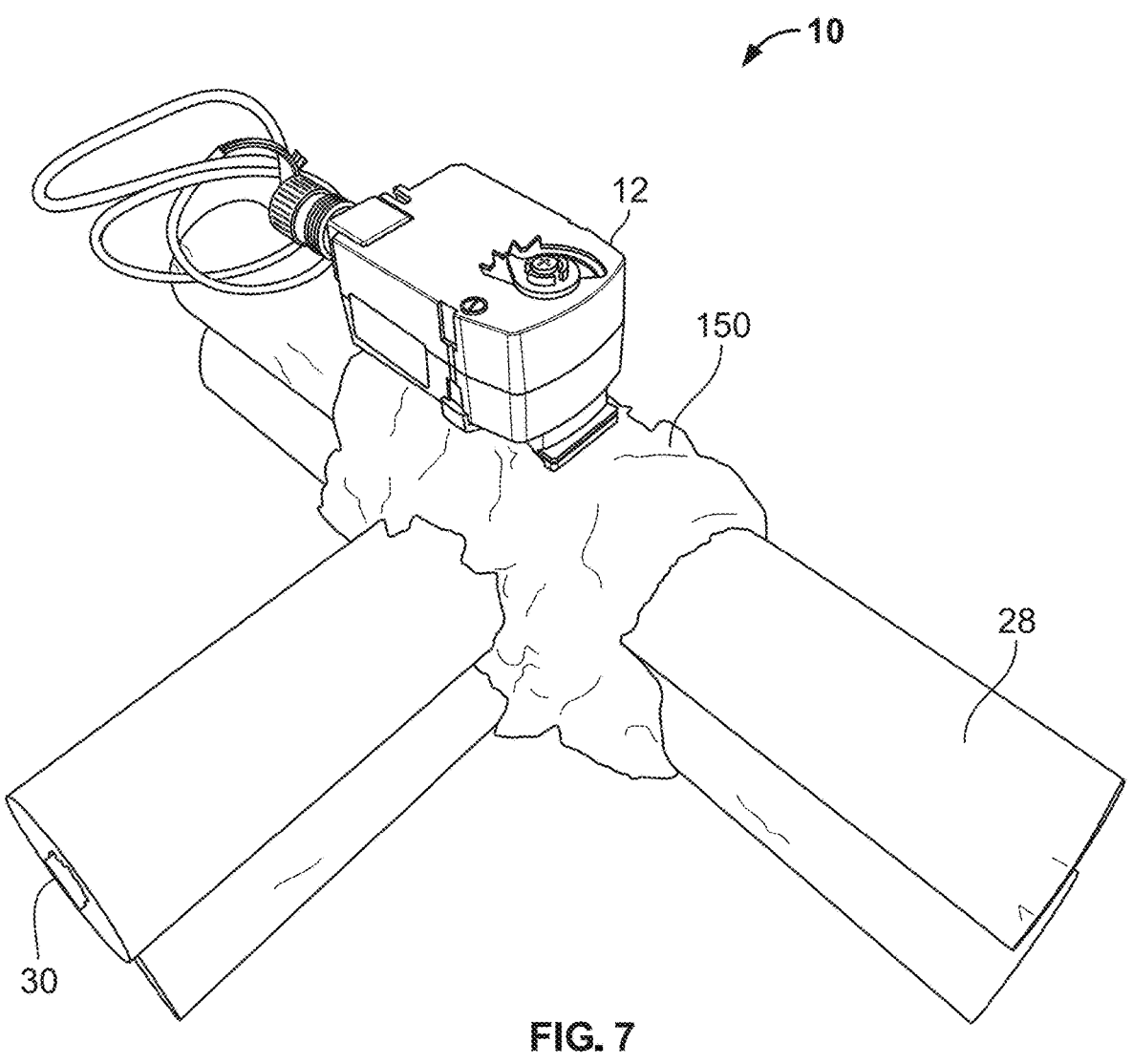
FIG. 7 is a perspective view of a 6-way valve with valve insulation in accordance with embodiments of the present disclosure.
Figure 8:
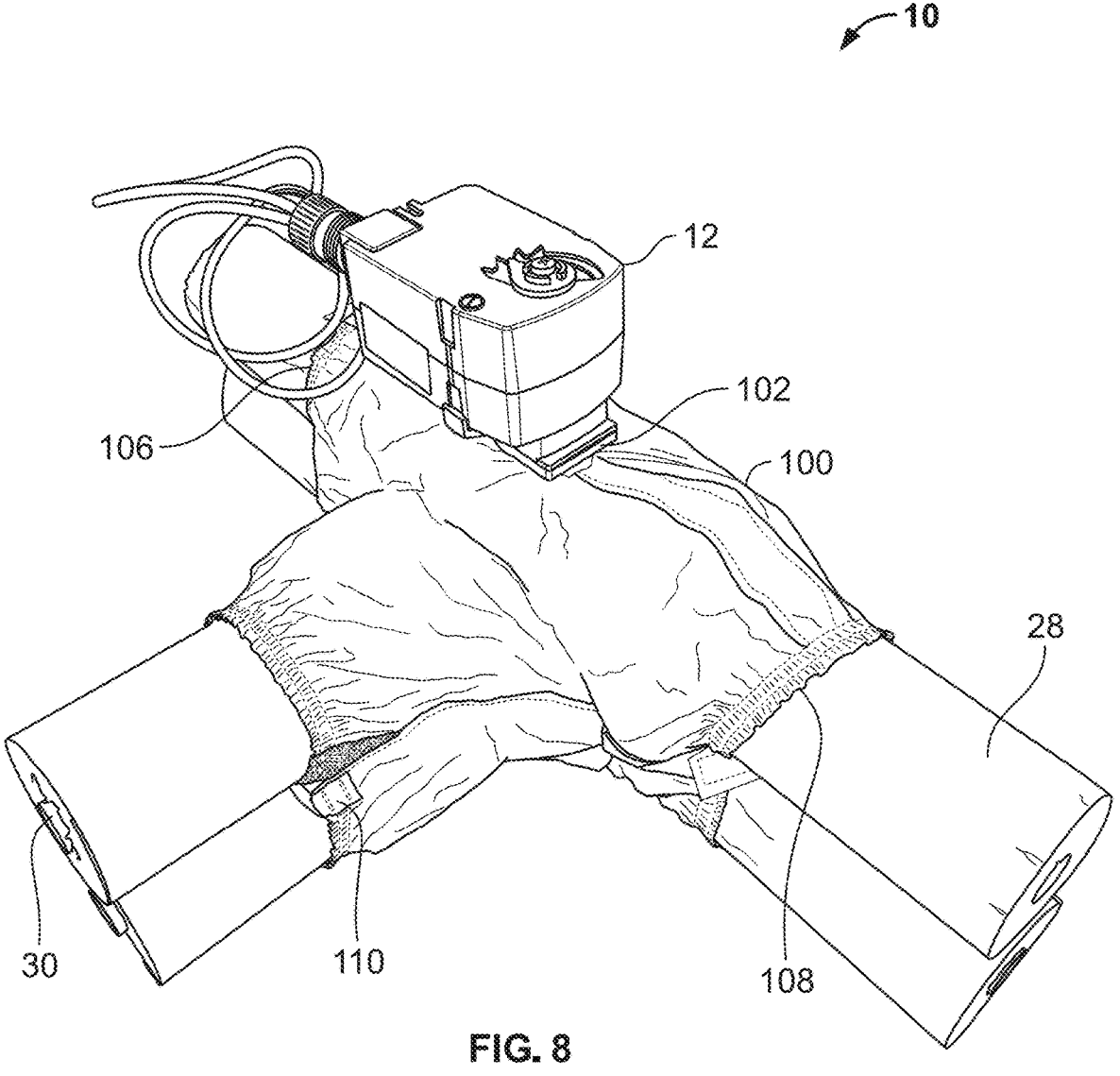
FIG. 8 is a perspective view of a 6-way valve with valve insulation and an exemplary pipe valve insulation cover in accordance with embodiments of the present disclosure.

FIGS. 7 and 8 illustrate insulation and the cover 100 installed over the valve 10. First, as shown in FIG. 7, loose insulation 150 can be wrapped around the valve body 14 such that only the actuator 12 is visible. The insulation 150 can also be wrapped at least partially around the insulation 28 over the pipes 30 to ensure proper insulation of the valve 10 and associated piping 30. After the loose insulation 150 is installed, the cover 100 can be positioned over the valve 10 and piping 30, as shown in FIG. 8.

In particular, the fastening elements 120*a*, 120*b*, 122*a*, 122*b*, 124*a*, 124*b* are each disengaged from their respective counterparts to completely open the cover 100. The open cover 100 can initially be positioned such that the first opening 102 (in the open configuration) allows sliding of the cover 100 up to the stem associated with the valve 10, while maintaining the actuator 12 exposed over the cover 100. The fastening elements 120*a*, 120*b* can then be engaged to secure the cover 100 under the actuator 12. Next, the fastening elements 122*a*, 122*b* can then be engaged to secure the second opening 106 around both pipes 30 extending adjacently away from the valve 10. The fastening elements 124*a*, 124*b* can then be engaged to secure the third opening 108 around both pipes 30 extending adjacently away from the valve 10 in the opposing direction. Securing of the fastening elements 122*a*, 122*b*, 124*a*, 124*b* also secures the fourth opening 110 around the pipes 30 extending adjacently in the central direction.

The gathering structures 104, 112, 114, 116 tightly secure the openings 102, 106, 108, 110 around the respective valve 10 and/or pipe 30 components. Finally, the separating elements 126, 128, 130 can be passed between the adjacently positioned pipes 30 and secured to their counterpart surfaces 132, 134, 136 to secure the position of the cover 100 over the pipes 30, and to cover any remaining gaps between the cover 100 and the insulation 28 at the openings 106, 108, 110. The cover 100 can thereby be efficiently and securely positioned around the valve 10 and the surrounding piping 30. If access to the valve 10 is needed, the fastening elements 120*a*, 120*b*, 122*a*, 122*b*, 124*a*, 124*b* can be disengaged as needed to partially or fully remove the cover 100 from the valve 10 and/or piping 30. The insulation 150 can also be removed (as needed) to access the valve body. Once work has been completed, the insulation 150 and cover 100 can be easily reinstalled without waste of materials. Complicated valves 10 can thereby be properly insulated and protected with the cover 100.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:
1. A pipe valve insulation cover, comprising:
a flexible sheet including a first side and a second side positioned over each other in a substantially overlapping manner, wherein in the overlapping configuration, the flexible sheet defines a top edge, a bottom edge opposing the top edge, a right edge, and a left edge opposing the right edge, and the flexible sheet defines a hollow interior;

a first opening formed in the flexible sheet at or near the top edge;

a second opening formed in the flexible sheet at or near the right edge;

a third opening formed in the flexible sheet at or near the left edge; and a fourth opening formed in the flexible sheet at or near the bottom edge;

wherein at least one of:

(i) each of the first, second, third and fourth openings include a gathering structure along their perimeter, and each gathering structure is an elastic band providing flexibility in expansion and contraction of a diameter of the first, second, third and fourth openings; or (ii) the pipe valve insulation cover comprises a separating element extending across each of the first, second, third and fourth openings, each separating element includes one end fixedly connected to an edge of the respective first, second, third and fourth openings, and an opposing end releasably connected from an opposing end of the respective first, second, third and fourth openings.

2. The pipe valve insulation cover of claim 1, wherein in the overlapped configuration, the flexible sheet defines a substantially T-shaped configuration.

3. The pipe valve insulation cover of claim 1, wherein a central longitudinal axis of the first opening is aligned with a central longitudinal axis of the fourth opening.

4. The pipe valve insulation cover of claim 1, wherein a central longitudinal axis of the second opening is aligned with a central longitudinal axis of the third opening.

5. The pipe valve insulation cover of claim 1, wherein a central longitudinal axis of the first and fourth openings is perpendicularly oriented to a central longitudinal axis of the second and third openings.

6. The pipe valve insulation cover of claim 1, wherein the top edge includes a non-separable section of the flexible sheet that connects the first side and the second side of the flexible sheet.

7. The pipe valve insulation cover of claim 6, wherein the non-separable section is the only structure non-releasably connecting the first side to the second side of the flexible sheet.

8. The pipe valve insulation cover of claim 1, wherein the top edge includes a first pair of complementary fastening elements extending from the first opening to the third opening.

9. The pipe valve insulation cover of claim 8, wherein the first pair of complementary fastening elements is separable from each other to separate the first side from the second side of the flexible sheet to expose the hollow interior.

10. The pipe valve insulation cover of claim 8, wherein the complementary fastening elements are hook and loop elements.

11. The pipe valve insulation cover of claim 1, wherein the right edge includes a second pair of complementary fastening elements extending from the second opening to the fourth opening.

12. The pipe valve insulation cover of claim 11, wherein the second pair of complementary fastening elements is separable from each other to separate the first side from the second side of the flexible sheet to expose the hollow interior.

13. The pipe valve insulation cover of claim 1, wherein the left edge includes a third pair of complementary fastening elements extending from the third opening to the fourth opening.

14. The pipe valve insulation cover of claim 13, wherein the third pair of complementary fastening elements is separable from each other to separate the first side from the second side of the flexible sheet to expose the hollow interior.

15. A pipe valve insulation cover system, comprising:

a flexible insulation configured to be at least partially wrapped around a valve; and a pipe valve insulation cover configured to be at least partially wrapped around the flexible insulation and the valve, wherein the pipe valve insulation cover includes:

a flexible sheet including a first side and a second side positioned over each other in a substantially overlapping manner, wherein in the overlapping configuration, the flexible sheet defines a top edge, a bottom edge opposing the top edge, a right edge, and a left edge opposing the right edge, and the flexible sheet defines a hollow interior;

a first opening formed in the flexible sheet at or near the top edge;

a second opening formed in the flexible sheet at or near the right edge;

a third opening formed in the flexible sheet at or near the left edge; and a fourth opening formed in the flexible sheet at or near the bottom edge;

wherein at least one of:

(i) each of the first, second, third and fourth openings of the pipe valve insulation cover include a gathering structure along their perimeter, and each gathering structure is an elastic band providing flexibility in expansion and contraction of a diameter of the first, second, third and fourth openings; or (ii) the pipe valve insulation cover comprises a separating element extending across each of the first, second, third and fourth openings, each separating element includes one end fixedly connected to an edge of the respective first, second, third and fourth openings, and an opposing end releasably connected from an opposing end of the respective first, second, third and fourth openings.

16. A method of pipe valve insulation, comprising:

wrapping a flexible insulation at least partially around a valve; and wrapping a pipe valve insulation cover at least partially around the flexible insulation and the valve, wherein the pipe valve insulation cover includes:

a flexible sheet including a first side and a second side positioned over each other in a substantially overlapping manner, wherein in the overlapping configuration, the flexible sheet defines a top edge, a bottom edge opposing the top edge, a right edge, and a left edge opposing the right edge, and the flexible sheet defines a hollow interior configured to at least partially receive the flexible insulation and the valve;

a first opening formed in the flexible sheet at or near the top edge;

a second opening formed in the flexible sheet at or near the right edge;

a third opening formed in the flexible sheet at or near the left edge; and a fourth opening formed in the flexible sheet at or near the bottom edge;

wherein at least one of:

(i) each of the first, second, third and fourth openings of the pipe valve insulation cover include a gathering structure along their perimeter, and each gathering structure is an elastic band providing flexibility in expansion and contraction of a diameter of the first, second, third and fourth openings; or (ii) the pipe valve insulation cover comprises a separating element extending across each of the first, second, third and fourth openings, each separating element includes one end fixedly connected to an edge of the respective first, second, third and fourth openings, and an opposing end releasably connected from an opposing end of the respective first, second, third and fourth openings.

* * * * *